United States Patent
Hecht et al.

(10) Patent No.: US 11,822,670 B2
(45) Date of Patent: Nov. 21, 2023

(54) SECURITY RISK ASSESSMENT AND CONTROL FOR CODE

(71) Applicant: CyberArk Software Ltd., Petach-Tikva (IL)

(72) Inventors: Asaf Hecht, Petach-Tikva (IL); Hadas Elkabir, Petach-Tikva (IL)

(73) Assignee: CyberArk Software Ltd., Petach-Tikva (IL)

( * ) Notice: Subject to any disclaimer, the term of this patent is extended or adjusted under 35 U.S.C. 154(b) by 0 days.

(21) Appl. No.: 16/824,957

(22) Filed: Mar. 20, 2020

(65) Prior Publication Data

US 2020/0364345 A1    Nov. 19, 2020

Related U.S. Application Data

(63) Continuation of application No. 16/414,124, filed on May 16, 2019, now Pat. No. 10,607,015.

(51) Int. Cl.
*G06F 21/57* (2013.01)
*G06F 9/54* (2006.01)

(52) U.S. Cl.
CPC .............. *G06F 21/577* (2013.01); *G06F 9/54* (2013.01); *G06F 2221/033* (2013.01)

(58) Field of Classification Search
None
See application file for complete search history.

(56) References Cited

U.S. PATENT DOCUMENTS

| | | | |
|---|---|---|---|
| 9,921,952 B2 | 3/2018 | Dean et al. | |
| 10,515,212 B1* | 12/2019 | McClintock | G06F 21/57 |
| 2009/0254993 A1* | 10/2009 | Leone | G06F 21/51 |
| | | | 726/25 |
| 2012/0110174 A1* | 5/2012 | Wootton | H04W 4/00 |
| | | | 709/224 |
| 2012/0240236 A1* | 9/2012 | Wyatt | G06F 21/564 |
| | | | 726/25 |
| 2013/0152047 A1 | 6/2013 | Moorthi et al. | |
| 2014/0196150 A1* | 7/2014 | Bettini | G06F 16/951 |
| | | | 726/25 |
| 2016/0321582 A1* | 11/2016 | Broudou | G06N 20/00 |
| 2016/0357660 A1* | 12/2016 | Dean | G06F 8/00 |

(Continued)

*Primary Examiner* — Arezoo Sherkat
(74) *Attorney, Agent, or Firm* — Finnegan, Henderson, Farabow, Garrett & Dunner, LLP

(57) ABSTRACT

Disclosed embodiments relate to systems and methods for automatically detecting and addressing security risks in code segments. Techniques include accessing a plurality of code segments developed for execution in a network environment, automatically identifying a first code segment from the plurality of code segments for analysis, automatically performing a first code-level security risk assessment for the first code segment, and determining a first security risk level for the first code segment based on the application programming interface risk level. The first code-level security risk assessment may be performed based on at least one of an application programming interface risk level, an embedded credentials risk level, and a target resource risk level. Further techniques may include determining a second security risk level for a modified version of the first code segment; and enabling a comparison between the first security risk level and the second security risk level.

20 Claims, 10 Drawing Sheets

(56) References Cited

U.S. PATENT DOCUMENTS

| | | | |
|---|---|---|---|
| 2017/0061126 A1* | 3/2017 | Hooks | H04L 63/1441 |
| 2017/0091078 A1* | 3/2017 | Atyam | G06F 11/3672 |
| 2017/0200006 A1* | 7/2017 | Gershoni | G06Q 10/06 |
| 2017/0213037 A1* | 7/2017 | Toledano | H04L 63/06 |
| 2017/0264640 A1* | 9/2017 | Narayanaswamy | H04L 63/0281 |
| 2018/0039494 A1 | 2/2018 | Lander et al. | |
| 2018/0129483 A1 | 5/2018 | Biddle et al. | |
| 2018/0157842 A1* | 6/2018 | Holz | G06F 21/577 |
| 2018/0293389 A1* | 10/2018 | Mahaffey | H04L 63/1408 |
| 2018/0359244 A1* | 12/2018 | Cockerill | H04L 63/0823 |
| 2019/0114435 A1* | 4/2019 | Bhalla | G06F 21/55 |
| 2019/0294802 A1* | 9/2019 | Eacmen, III | G06F 21/572 |
| 2020/0117458 A1* | 4/2020 | Barnes | G06F 9/3861 |

* cited by examiner

631
```
$policies = Get-IAMPolicyList
$number = $managedPolicies.Count
Write-host "Discovered $numberPolicies policies"
```

632
```
$policies = Get-IAMPolicyList --AccessKey AKIA4SMUA7B3AY --SecretKey t8#*sb46aj2lf92jfolgbwo1x  △ 641
$number = $managedPolicies.Count
Write-host "Discovered $numberPolicies policies"
```

633
```
$AccessKey = AKIA4SMUA7B3AY
$SecretKey = t8#*sb46aj2lf92jfolgbwo1x  △ 642
$policies = Get-IAMPolicyList --AccessKey $accessKey --SecretKey $secretKey
$number = $managedPolicies.Count
Write-host "Discovered $numberPolicies policies"
```

*FIG. 6A*

611
```
$policies = Get-IAMPolicyList  ~621
$number = $managedPolicies.Count
Write-host "Discovered $numberPolicies policies"
```

612
```
$groups = Get-IAMGroup       622
$results = New-IAMGroup  ~623
Write-host $results
```

613
```
$userList = Get-IAMUserList    624
$results = Remove-IAMVirtualMFADevice  ~625
Write-host $results
```

*FIG. 6B*

SECURITY RISK ASSESSMENT AND CONTROL FOR CODE

CROSS-REFERENCE TO RELATED APPLICATIONS

This application is a continuation of U.S. patent application Ser. No. 16/414,124, filed on May 16, 2019 (pending). The aforementioned application is incorporated herein by reference in its entirety.

BACKGROUND

In modern, network-based environments, organizations often produce and utilize vast amounts of software and computer code for day-to-day operations. Organizations may therefore maintain or even develop software with hundreds of thousands, if not millions of individual functions, collectively. Such functions may require access to sensitive resources within the organization and may have the ability to perform irreversible actions on these resources. Therefore, if certain pieces of software fall into the wrong hands or are inadvertently misused by an employee, potentially devastating data loss or security breaches may occur. For example, such software functions sometimes include hard-coded credentials to perform operations on a target resource. If an attacker hijacks or otherwise obtains the code, even slight modifications could provide the attacker with access to highly sensitive data or the ability to perform malicious operations. Accordingly, security and management of this code can be of critical importance to the organization.

To address this risk, conventional techniques focus on hardening security for access to the code itself. For example, organizations may implement security requirements, such as privileged account access, multi-factor authentication, or various other techniques to limit unwanted access to the code. While these security measures may provide some protection, they are not failproof, are inflexible, and are difficult to scale with increasing volumes of code. For example, many of these techniques rely on the prudence of individual employees, which presents a potential security flaw and practical limitation. Further, while these measures may inhibit access by attackers, inadvertent modifications to code by entities within the organization can still be devastating.

Some other techniques may attempt to monitor software within an organization. But the vast amount of code each software application includes, and the ever-changing nature of the software, may prevent an organization from accurately determining which software presents the greatest risk. Further, it may be hard to prioritize which code should be protected in which order and to what degree.

Accordingly, in view of these and other deficiencies in existing techniques, technological solutions are needed for automatically detecting and addressing security risks in code segments. Solutions should advantageously allow for code to be assessed dynamically as it is developed or modified within the network environment. A secure, flexible, and scalable solution should identify risk based on an analysis of software at the code level and should be based on a number of factors indicating the potential for harm flowing from the code. The assessment of software code should also occur at a granular level, allowing analysis of smaller portions of code to improve efficiency and accuracy. Further, effective technological solutions should allow for customization of the calculated risk level based on features of the network environment.

SUMMARY

The disclosed embodiments describe non-transitory computer readable media, systems, and methods for assessing security risks in code segments. For example, in an exemplary embodiment, there may be a non-transitory computer readable medium including instructions that, when executed by at least one processor, cause the at least one processor to perform operations for automatically detecting and addressing security risks in code segments. The operations may comprise accessing a plurality of code segments developed for execution in a network environment; automatically identifying a first code segment from the plurality of code segments for analysis automatically performing a first code-level security risk assessment for the first code segment, the first code-level security risk assessment being performed based on at least one of: an application programming interface risk level, based on at least a number or a type of one or more application programming interface action calls associated with the first code segment, an embedded credentials risk level, based on at least a number or a type of one or more credentials associated with the first code segment, and a target resource risk level, based on at least a number or a type of one or more references to target resources associated with the first code segment; determining a first security risk level for the first code segment based on the application programming interface risk level, the embedded credentials risk level, and the target resource risk level; automatically performing a second code-level security risk assessment for a modified version of the first code segment, the modified version of the first code segment including a change to at least one of: the application programming interface risk level, the embedded credentials risk level, or the target resource risk level; determining a second security risk level for the modified version of the first code segment; and enabling a comparison between the first security risk level and the second security risk level to identify a change in security risk associated with the first code segment, wherein a user is enabled to view the first security risk level and the second security risk level.

According to a disclosed embodiment, the first code segment may be alterable, in real time, to produce the modified version of the first code segment.

According to a disclosed embodiment, accessing the plurality of code segments may include dynamically scanning the network environment in real time.

According to a disclosed embodiment, accessing the plurality of code segments may include analyzing a devops pipeline comprising the plurality of code segments, wherein the plurality of code segments have not yet been deployed into production.

According to a disclosed embodiment, the operations may further comprise automatically generating a report based on the change in security risk associated with the first code segment, the report identifying the change to at least one of the application programming interface risk level, the embedded credentials risk level, or the target resource risk level.

According to a disclosed embodiment, automatically performing the first code-level security risk assessment may include determining a customizable risk factor that is configured to be unique to the network environment.

According to a disclosed embodiment, the operations may further comprise updating a profile, associated with a creator of the first code segment, based on the change in security risk associated with the first code segment.

According to a disclosed embodiment, the application programming interface risk level may be based on a determination of whether the one or more application programming interface action calls have security risks.

According to a disclosed embodiment, the embedded credentials risk level may be based on a degree of privileged access associated with the one or more credentials.

According to a disclosed embodiment, the target resource risk level may be based on a determination of whether the target resources are sensitive network resources.

According to another disclosed embodiment, a method may be implemented for automatically detecting and addressing security risks in code segments. The method may comprise accessing a plurality of code segments developed for execution in a network environment; automatically identifying a first code segment from the plurality of code segments for analysis automatically performing a first code-level security risk assessment for the first code segment, the first code-level security risk assessment being performed based on at least one of: an application programming interface risk level, based on at least a number or a type of one or more application programming interface action calls associated with the first code segment, an embedded credentials risk level, based on at least a number or a type of one or more credentials associated with the first code segment, and a target resource risk level, based on at least a number or a type of one or more references to target resources associated with the first code segment; determining a first security risk level for the first code segment based on the application programming interface risk level, the embedded credentials risk level, and the target resource risk level; automatically performing a second code-level security risk assessment for a modified version of the first code segment, the modified version of the first code segment including a change to at least one of: the application programming interface risk level, the embedded credentials risk level, or the target resource risk level; determining a second security risk level for the modified version of the first code segment; and enabling a comparison between the first security risk level and the second security risk level to identify a change in security risk associated with the first code segment, wherein a user is enabled to view the first security risk level and the second security risk level.

According to a disclosed embodiment, the method may further comprise generating a report based on the change in security risk associated with the first code segment, the report identifying a privilege threat alert associated with the first code segment.

According to a disclosed embodiment, the method may further comprise performing, based on the change in security risk associated with the first code segment, a privilege mitigation action for preventing the first code segment from being deployed for execution in the network environment.

According to a disclosed embodiment, the method may further comprise performing, based on the change in security risk associated with the first code segment, a privilege mitigation action for disabling the one or more credentials.

According to a disclosed embodiment, the method may further comprise performing, based on the change in security risk associated with the first code segment, a privilege mitigation action for changing an authentication requirement associated with the one or more target resources.

According to a disclosed embodiment, the method may further comprise performing, based on the change in security risk associated with the first code segment, a privilege mitigation action for adding an authentication requirement for the first code segment.

According to a disclosed embodiment, the first code-level security risk assessment may be performed automatically upon creation of the first code segment.

According to a disclosed embodiment, the first code-level security risk assessment may be performed automatically in response to a change in the first code segment.

According to a disclosed embodiment, the first code-level security risk assessment may be performed automatically in response to a change in the one or more application programming interface action calls.

According to a disclosed embodiment, the first code-level security risk assessment is performed automatically in response to a change in the one or more credentials.

Aspects of the disclosed embodiments may include tangible computer-readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings:

FIG. 6A is an exemplary illustration depicting code blocks that may be analyzed for determining an embedded credentials risk score in accordance with disclosed embodiments.

FIG. 6B is an exemplary illustration depicting code blocks that may be analyzed for calculation of an API risk score in accordance with disclosed embodiments.

DETAILED DESCRIPTION

Figure 1:
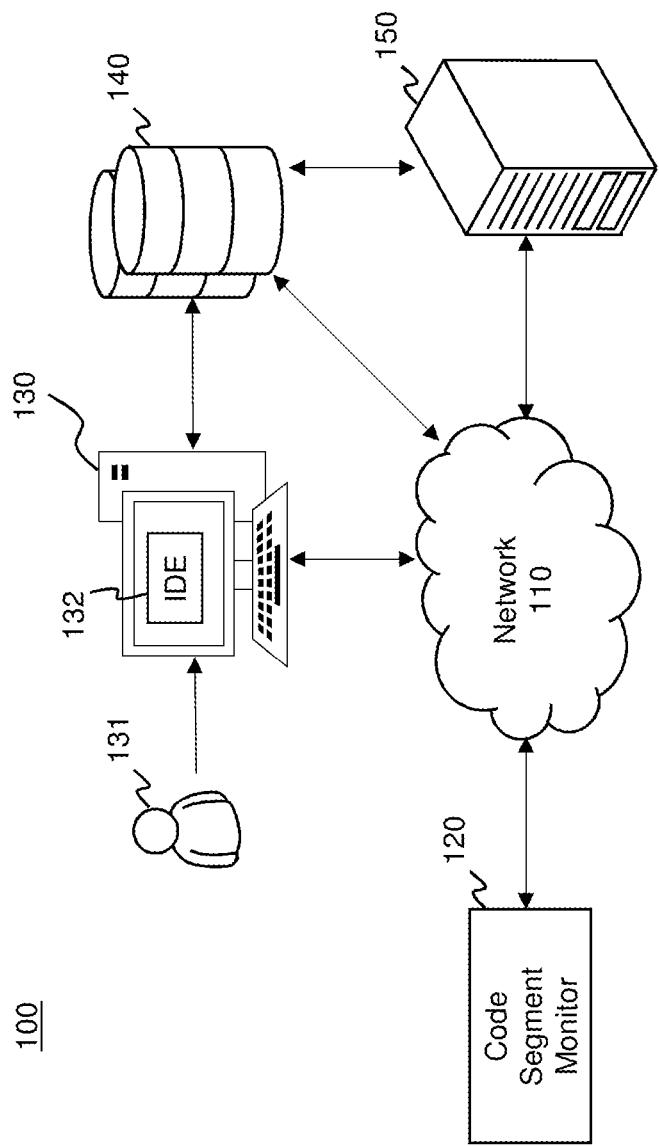
FIG. 1 is a block diagram of an exemplary system for detecting and addressing security risks in code segments in accordance with disclosed embodiments.

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

The techniques of assessing risk for code segments described herein overcome several technological problems relating to security, efficiency, scalability, and functionality associated with software development and implementation. The disclosed embodiments provide techniques for automatically identifying one or more code segments and performing a security assessment on the code segment. The assessment may take into account various features of the code segment that may indicate the potential for harm, such as credentials that are hard-coded into the code segment, API calls that are used, and resources that are targeted by the code. The combined use of these components provides a robust and accurate assessment of the security risk posed by an identified code segment. The assessment may also take into account other characteristics of the environment that may affect the security risk of the code segment. This allows for customization of the security risk assessment based on other factors that may be specific to the network environment. Further, by analyzing individual segments of a larger code structure, security risks can be more easily pinpointed and the risk can be tracked over time for individual segments.

In some embodiments, the disclosed techniques may also be performed dynamically, in real time, allowing each code section to be assessed as it is created and/or modified. This may allow the risk level for a particular code segment, or even a particular developer to be tracked over time, which may provide further insight into security risks. For example, an anomaly or change in a security risk level for a given code segment may indicate an error or malicious activity, which may then be addressed or investigated further. Because the security risk levels are tracked based on individual code segments and are assessed based on multiple risk level components, potentially harmful modifications and the developer who made the modification can be easily identified.

In some embodiments, code segments may be flagged, categorized or otherwise identified based on whether the associated combined risk score or privilege level exceeds one or more thresholds. This may allow code segments that present greater risk to be treated with greater care and/or assigned different security levels than other code segments, even within the same software or code. This may also allow code sections to be prioritized, for example as to which code segments receive one or more security measures and in which order they should be received. The disclosed techniques may also be integrated with other existing security solutions to facilitate and enhance the capabilities of these solutions.

Reference will now be made in detail to the disclosed embodiments, examples of which are illustrated in the accompanying drawings.

FIG. 1 illustrates an exemplary system 100 for detecting and addressing security risks in code segments, consistent with the disclosed embodiments. System 100 may represent an environment in which software code is developed and/or executed, for example in a cloud environment. System 100 may include one or more code segment monitor 120, one or more computing devices 130, one or more databases 140, and one or more servers 150, as shown in FIG. 1.

The various components may communicate over a network 110. Such communications may take place across various types of networks, such as the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, an enterprise or private data network, a storage area network, a virtual private network using a public network, a nearfield communications technique (e.g., Bluetooth, infrared, etc.), or various other types of network communications. In some embodiments, the communications may take place across two or more of these forms of networks and protocols. While system 100 is shown as a network-based environment, it is understood that the disclosed systems and methods may also be used in a localized system, with one or more of the components communicating directly with each other.

Computing devices 130 may be a variety of different types computing devices capable of developing, storing, analyzing, and/or executing software code. For example, computing device 130 may be a personal computer (e.g., a desktop or laptop), an IoT device (e.g., sensor, smart home appliance, connected vehicle, etc.), a server, a mainframe, a vehicle-based or aircraft-based computer, a virtual machine (e.g., virtualized computer, container instance, etc.), or the like. Computing device 130 may be a handheld device (e.g., a mobile phone, a tablet, or a notebook), a wearable device (e.g., a smart watch, smart jewelry, an implantable device, a fitness tracker, smart clothing, a head-mounted display, etc.), an IoT device (e.g., smart home devices, industrial devices, etc.), or various other devices capable of processing and/or receiving data. Computing device 130 may operate using a Windows™ operating system, a terminal-based (e.g., Unix or Linux) operating system, a cloud-based operating system (e.g., through AWS™, Azure™, IBM Cloud™, etc.), or other types of non-terminal operating systems. As discussed further below, computing devices 130 may be used for developing and/or running software code, functions or scripts. For example, a user 131 may develop software code through an Integrated Development Environment (IDE) 132 operated on computing device 130.

System 100 may further comprise one or more database(s) 140, for storing and/or executing software. For example, database 140 may be configured to store software or code, such as code developed using computing device 130. Database 140 may further be accessed by computing device 130, server 150, or other components of system 100 for downloading, receiving, processing, editing, or running the stored software or code. Database 140 may be any suitable combination of data storage devices, which may optionally include any type or combination of slave databases, load balancers, dummy servers, firewalls, back-up databases, and/or any other desired database components. In some embodiments, database 140 may be employed as a cloud service, such as a Software as a Service (SaaS) system, a Platform as a Service (PaaS), or Infrastructure as a Service (IaaS) system. For example, database 140 may be based on infrastructure of services of Amazon Web Services™ (AWS), Microsoft Azure™ Google Cloud Platform™ Cisco Metapod™, Joyent™, vmWare™, or other cloud computing providers. Data sharing platform 140 may include other commercial file sharing services, such as Dropbox™ Google Docs™, or iCloud™. In some embodiments, data sharing platform 140 may be a remote storage location, such as a network drive or server in communication with network 110. In other embodiments database 140 may also be a local storage device, such as local memory of one or more computing devices in a distributed computing environment.

System 100 may also comprise one or more server device(s) 150 in communication with network 110. Server device 150 may manage the various components in system 100. In some embodiments, server device 150 may be configured to process and manage requests between computing devices 130 and/or databases 140. In embodiments where software code is developed within system 100, server device 150 may manage various stages of the development process, for example, by managing communications between computing devices 130 and databases 140 over network 110.

Code segment monitor 120 may be any device, component, program, script, or the like, for monitoring and assessing code or functions within system 100, as described in more detail below. Code segment monitor 120 may be configured to monitor various other components within system 100, including computing device 130, user 131, Integrated Development Environment 132, database 140, and server 150. In some embodiments, code segment monitor 120 may be implemented as a separate component within system 100, capable of monitoring software and computer codes or scripts within network 110. In other embodiments, code segment monitor 120 may be a program or script and may be executed by another component of system 100.

Figure 2:
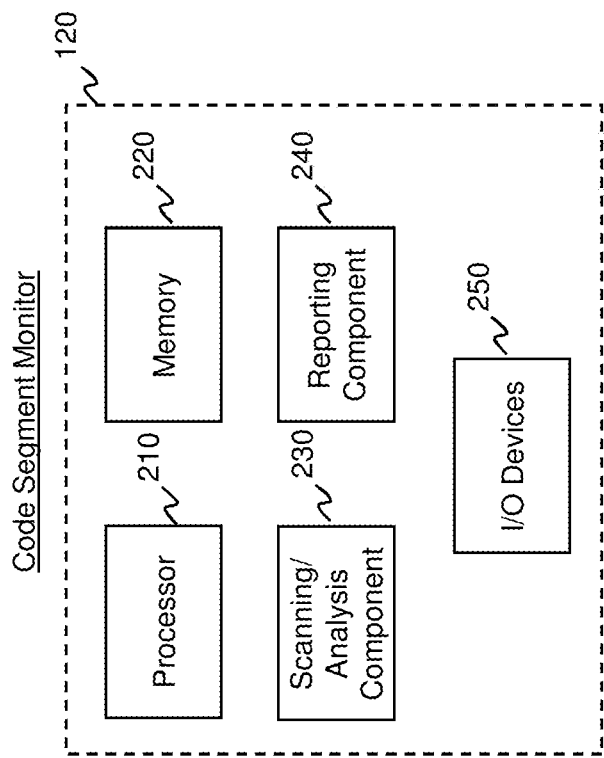
FIG. 2 is a block diagram showing an exemplary code segment monitor in accordance with disclosed embodiments.

Code segment monitor 120 may comprise additional elements to facilitate monitoring and analysis of software, code, functions and/or scripts within system 100. FIG. 2 is a block diagram showing an exemplary code segment monitor 120 in accordance with disclosed embodiments. For example, code segment monitor 120 may be a computing device and may include one or more dedicated processors 210 and/or memories 220. Processor (or processors) 210 may include one or more data or software processing devices. For example, the processor 210 may take the form of, but is not limited to, a microprocessor, embedded processor, or the like, or may be integrated in a system on a chip (SoC). Furthermore, according to some embodiments, the processor 210 may be from the family of processors manufactured by Intel®, AMO®, Qualcomm®, Apple®, NVIDIA®, or the like. The processor 210 may also be based on the ARM architecture, a mobile processor, or a graphics processing unit, etc. The disclosed embodiments are not limited to any type of processor configured in the computing device 120.

Memory (or memories) 220 may include one or more storage devices configured to store instructions used by the processor 210 to perform functions related to the disclosed embodiments. Memory 220 may be configured to store software instructions, such as programs, that perform one or more operations when executed by the processor 210 to securely obtain data from scanning device 130, for example, using methods 800 and 900, described in detail below. The disclosed embodiments are not limited to particular software programs or devices configured to perform dedicated tasks. For example, the memory 220 may store a single program, such as a user-level application, that performs the functions of the disclosed embodiments, or may comprise multiple software programs. Additionally, the processor 210 may in some embodiments execute one or more programs (or portions thereof) remotely located from the computing device 120. Furthermore, the memory 220 may include one or more storage devices configured to store data for use by the programs.

Code segment monitor 120 may further comprise one or more components for performing various operations of the disclosed embodiments. For example, code segment monitor 120 may contain a scanning/analysis component 230 and a reporting component 240. Scanning/analysis component 230 may be configured to obtain or receive code or code segments from other components or devices within system 100. For example, scanning/analysis component 230 may be configured to monitor computing device 130, database 140, or server 150 for code segments and generate a risk score or privilege level associated with the code segment, as described further below. Reporting component 240 may be configured to produce reports including the risk scores or privilege levels generated by scanning/analysis component 230.

Scanning/analysis component 230 and reporting component 240 may be separate components of code segment monitor 120, for example, with dedicated processors and/or memories. In other embodiments, though shown separately in FIG. 2, scanning/analysis component 230 and reporting component 240 may be integrated into memory 220 and/or processor 210. For example, scanning/analysis component 230 and/or reporting component 240 may be software code, a script, or an application stored on memory 220 and/or executed by processor 210. Further, while code segment monitor 120 is shown as having dedicated processor 210 and memory 220, code segment monitor 120 itself may be integrated into various other components in system 100. For example, processor 210 and/or memory 220 may be the processor and memory devices of another component in system 100, for example on server 150, database 140, or computing device 130. In such embodiments, code segment monitor 120 may be executed as software code, a script, or an application.

Code segment monitor 120 may further include one or more input/output (I/O) devices 250. I/O devices 250 may include one or more network adaptors or communication devices and/or interfaces (e.g., WiFi, Bluetooth®, RFID, NFC, RF, infrared, Ethernet, etc.) to communicate with other machines and devices, such as with other components of system 100 through network 110. For example, code segment monitor 120 may use a network adaptor to scan for code and code segments within system 100. In some embodiments, the I/O devices 250 may also comprise a touchscreen configured to allow a user to interact with code segment monitor 120 and/or an associated computing device. The I/O devices 250 may comprise a keyboard, mouse, trackball, touch pad, stylus, and the like. Similar to processor 210 and memory 220, in embodiments where code segment monitor 120 is executed as software or code, I/O devices 250 may be associated with another component of system 100.

Figure 3:
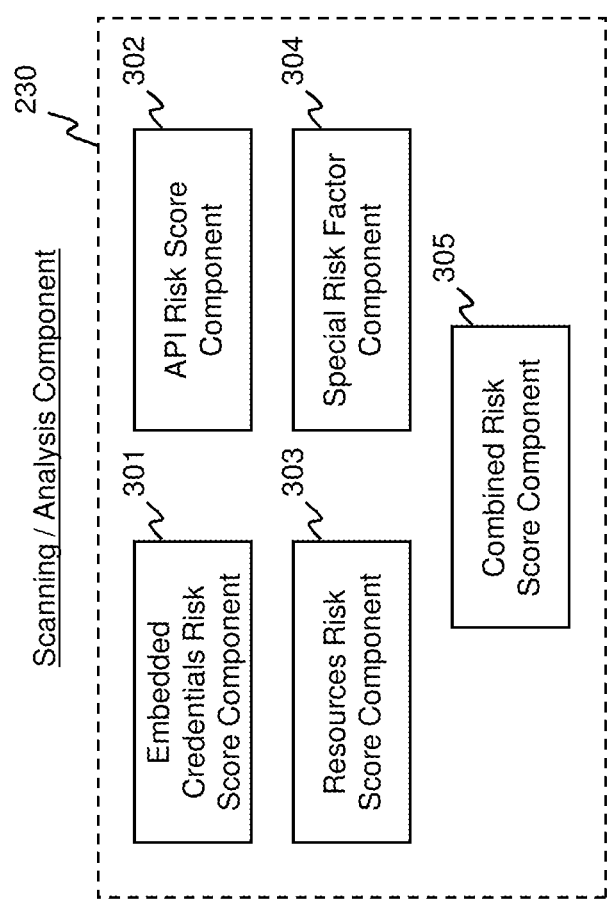
FIG. 3 is a block diagram showing an exemplary scanning and analysis component in accordance with disclosed embodiments.

FIG. 3 is a block diagram showing an exemplary scanning and analysis component 230 in accordance with disclosed embodiments. Scanning/analysis component 230 may comprise a number of other components or subcomponents 301, 302, 303, 304, and 305. As described above, scanning/ analysis component 230 may be software code, a script, or an application stored on memory 220 and/or executed by processor 210. Accordingly, the various components or subcomponents of scanning/analysis component 230 may also be executed as software code, scripts or applications. As shown in FIG. 3, scanning/analysis component 230 may comprise an embedded credentials risk score component 301, an API risk score component 302, a resources risk score component 303, a special risk factor component 304, and a combined risk score component 305.

Each of these subcomponents may be configured to assess code segments detected or received by code segment monitor 120 to determine various risk scores or risk score components. For example, embedded credentials risk score component 301 may scan a code segment for credentials that may be embedded within the code segment and then generate an embedded credentials risk score associated with the code segment. API risk score component 302 may similarly analyze a code segment for API functions or calls and determine an associated risk score based on the type and functions of the API calls. Resources risk score component 303 may be configured to scan the code segment for one or more target resources in the functions of the code and generate a corresponding risk score. Special risk factor component 304 may scan the code segment for various other factors and generate a factor or other adjustments to the combined risk score or privilege level determined by combined risk score component 305, which may be based on one or more of the risk scores and/or factors determined by components 301, 302, 303, and 304. Each of these risk scores and factors are discussed in further detail below.

Figure 4:
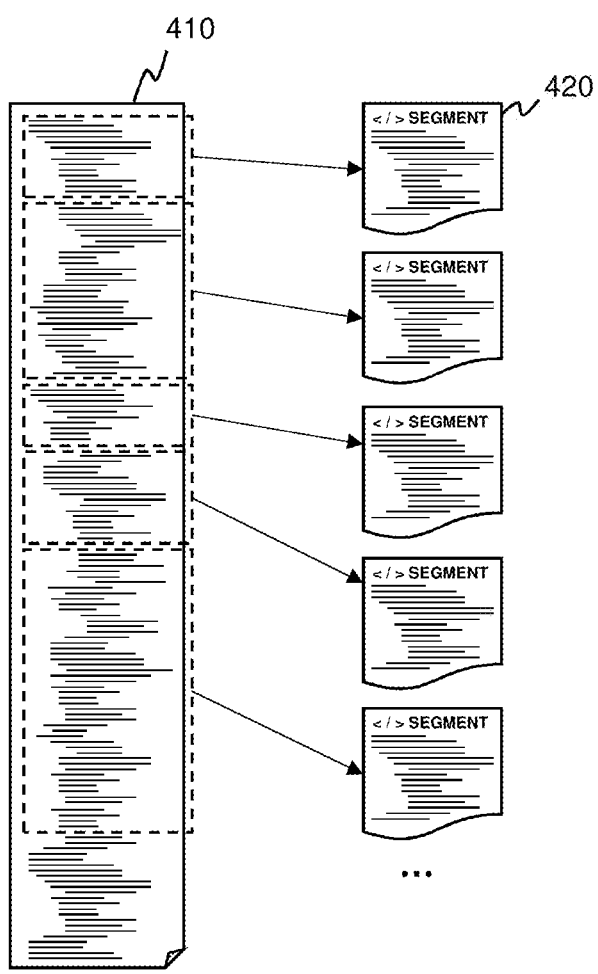
FIG. 4 is an exemplary illustration depicting a plurality of code segments extracted from a software code in accordance with disclosed embodiments.

As described previously, code segment monitor 120 may be configured to detect, monitor, analyze, and/or assess various code within system 100. Code segment monitor 120 may also be configured detect, monitor, analyze, and/or assess various segments of the code or software. FIG. 4 is an exemplary illustration depicting a plurality of code segments 420 extracted from a code 410 in accordance with disclosed embodiments. Code 410 may be any form of computer-based code, including software, mobile applications, scripts, web applications, "instant" apps, server-side applications, APIs, embedded code (e.g., in an IoT device, Raspberry Pi, Arduino, etc.), or any other form of code. Code 410 may also be written in any suitable programming language, including but not limited to Java, Python, C, Ruby, JavaScript, C#, .NET, PHP, Objective-C, SQL, Go, C++, or various other programming languages. Code 410 may also implement one or more API actions, for example, based on AWS™ (e.g., Amazon S3™, Amazon EC2™, Amazon Elastic Beanstalk™, AWS PowerShell™, etc.), Google™ (e.g., Google APIs™, Google Analytics™, Youtube™, Ad Exchange™, Google Maps,™ etc.), social media (Twitter™, Facebook™, Linkedin™, Pinterest™, Tumblr™, Instagram™, etc.), or various other APIs. Code 410 may contain functions which, when executed, cause actions to be performed on applications and/or data within the environment in which it is installed. For example, code 410 may be installed on one or more devices within system 100 (such as computing device 130, database 140, and/or server 150) and may cause various actions to be performed within system 110. Code 410 may call actions for performing actions on other code segments and on the external environment, which may include accessing, modifying, downloading, moving, deleting, or otherwise manipulating target data, files, applications, code segments, or other target resources in system 100.

As shown in FIG. 4, code 410 may be parsed into multiple code segments 420. Code 410 may be divided into segments by one or more components within system 100. In some embodiments, code segment monitor 120 may select code segments 420 from code 410 for analysis and risk assessment. For example, code segment monitor 120 may have access to code 410 and may determine which code segments need to be analyzed. In other embodiments, code segments 420 may be determined by other components within system 100, such as server 150, database 140, and/or computing device 130. Code segment monitor 120 may then analyze the one or more code segments 420 that have already been defined by system 100.

Code segment 140 may be broken up based on various factors. For example, code segment 420 may be determined based on a set length (e.g., a predefined number of characters, a predefined number of lines of code), a size (e.g., a predefined file size, disk space, etc.), functionality of the code (e.g., broken up based on functions or groups of functions), or various other methods. In some embodiments, the code segments 420 may be determined as code 410 is being developed. For example, code segments 420 may be determined each time a new portion of code is written in overall code 410, or may be compiled at predetermined intervals (e.g., every n seconds, hourly, daily, weekly, etc.). Therefore, code segments 420 may be uniform, or may be of varying lengths or sizes. Code segments 420 may or may not be stored separately from code 410. For example, in some embodiments, code segments 420 may be stored as data or metadata referencing code 410, such as referring to certain lines of code 410. Therefore, the data associated with code segments 420 may not actually contain any code but may reference portions of code 410. Accordingly, code segment monitor 120 may actually be reading from code 410 when analyzing a given code segment 420. In other embodiments, sections of code 410 may be copied or moved to a separate file corresponding to code segment 420. In such embodiments, code segment monitor 120 may analyze code segment 420 separate form code 410.

Figure 5:
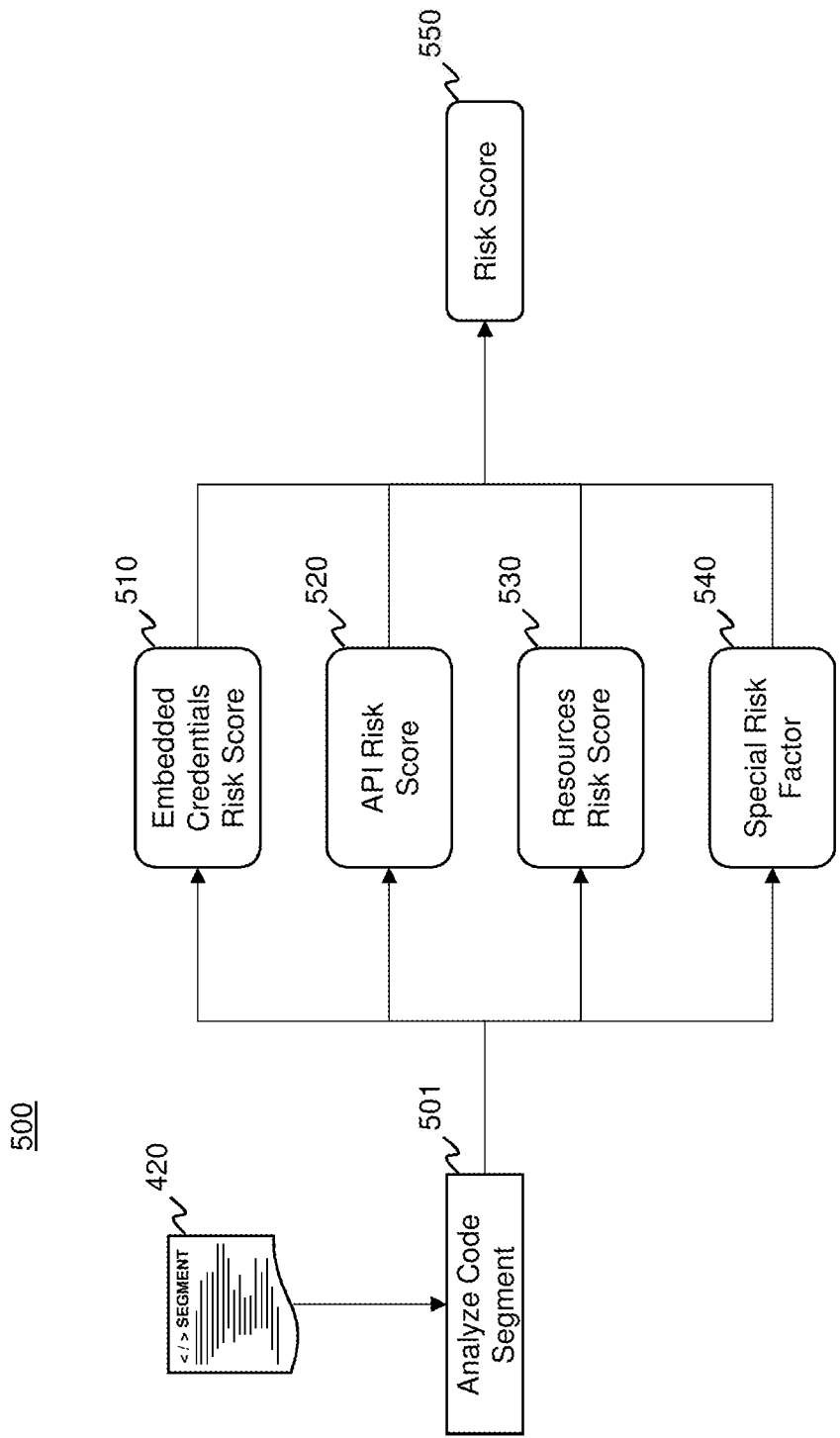
FIG. 5 is a block diagram depicting an exemplary process for determining a risk score associated with a code segment in accordance with disclosed embodiments.

FIG. 5 is a block diagram depicting an exemplary process 500 for determining a risk score associated with a code segment in accordance with disclosed embodiments. Process 500 may be performed, for example, by code segment monitor 120, or processor 210. Accordingly, code segment monitor 120 may access a code segment 420. As described above, code segment 420 may be a subset of an overall software code, such as code 410. Code segment monitor 120 may analyze the code segment 420, as illustrated by block 501, to generate a risk score 550. Risk score 550 may indicate the risk associated with code segment 420's ability to perform actions within system 100 and the potential impact of those actions. Therefore, the code segment 420 may be analyzed based on the actions or function used by the code segment 420, any credentials that the code may include for performing those actions, and the targets of those actions (e.g., the target resources that are being influenced by the actions that the code performs). By analyzing these risk score components, a risk 550 associated with the code segment 420 may be determined. Therefore, process 500 may include determining various risk scores 550 or factors associated with the code section 420 as shown in FIG. 5, such as an embedded credentials risk score 510, an API risk score 520, a resources risk score 530, and a special risk factor 540.

Embedded credentials risk score 510 may be determined by code segment monitor 120, for example by embedded credentials risk score component 301. Embedded credentials risk score 510 may reflect the number and type of credentials coded into code segment 420, which may be relevant to the risk level of the code segment. For example, if a code segment 420 contains a relatively risky API call or function, such as a deletion API call, but does not include the credentials required to perform that deletion action, the code segment will have a relatively low risk. If the code segment is compromised by attackers or somehow misused by someone with legitimate access to the code segment, the deletion action could not be performed automatically. Credentials not included in the code itself would still be needed to carry out the deletion action. Only by providing credentials external to the code segment, could the deletion actions it contains be successfully performed.

FIG. 6A is an illustration depicting exemplary code blocks for determining an embedded credentials risk score in accordance with disclosed embodiments. Code blocks 631, 632, and 633 may be scanned for embedded credentials for determining embedded credentials risk score 510. Code blocks 631, 632, and 633 may represent an entire code segment 420, or may be a subset of code within code segment 420. In the example of code block 631, no embedded credentials are included. For example, code block 631 includes API call, "Get IAMPolicyList," which may correspond to an API call for AWS PowerShell™ to list all managed policies that are available in an AWS™ account. Code block 631, however, does not include any credentials for enabling this action to be performed and a user would still need to provide credentials to carry out the API call. In contrast, code blocks 632 and 633 contain embedded credentials that may be identified for determining embedded credentials risk score 510. In code block 632, for example, AccessKey "AKIA4SMUA7B3AY" and SecretKey "t8#*sb46aj2If92jfolgbwo1x" are included in-line with the API call. Embedded credentials 641, therefore, may be identified as part of the process determining embedded credentials risk score 510. Similarly, code block 633 includes embedded credentials 642, which are defined as variables in lines of code preceding the API call. Both of these examples containing the embedded credentials may represent an increased risk.

The embedded credentials may be identified in a variety of ways. For example, the code section may be searched for a number of indicators (e.g., "SecretKey" from the example above) and the subsequent text associated with the indicator. In some embodiments, artificial intelligence (AI) or machine learning techniques may be used to identify embedded credentials in a code segment. As part of determining the embedded credentials risk score, the total number of embedded credentials may be tallied for a particular code segment 420. A code segment with more hard-coded credentials may result in a higher embedded credentials risk score because there is greater potential for harm in system 100 if the code segment is misappropriated or misused.

The embedded credentials risk score 510 may further depend on the type or privilege level of the embedded credentials identified within code segment 420. Accordingly, the embedded credentials risk score component 301 may perform further assessments on each of the identified embedded credentials. For example, a privilege level of the embedded credentials may be determined. This may include looking up each embedded credential in a list or database to determine a privilege level for the credentials. An embedded credential with a higher privilege level may represent a greater risk because of the actions that may be performed using the credentials. For example, a high privilege level may indicate the embedded credentials authorize access to a greater number of target resources, or target resources with more stringent security requirements. A higher privilege level may therefore correspond to an ability to perform a greater number or type of actions in system 100, or actions that are more restricted.

Embedded credentials risk score 510 may then be calculated based on the number of hard-coded credentials and the privilege level of those credentials. These values may be factored in various ways, for example, using a weighted average. The total number of embedded credentials may be weighted, such that an embedded credential with a higher privilege level has a greater impact on the embedded credentials risk score. Additional factors may also be included in the calculation, such as the type of credential (e.g., username and password, token, biometric data, etc.), or various other factors. Embedded credentials risk score 510 may also be represented in various forms or formats. For example, embedded credentials risk score 510 may be represented as a percentage, a numerical value, on a scale (e.g., ranging from 1-10 or 1-5), as a range of classifications (e.g. "moderate risk," "high risk," etc.), as text, as a graphic (e.g., a bar graph or other pictorial representation), a color, a combination of any of the above, or various other representations.

Returning to FIG. 5, API risk score 520 may also be determined as part of process 500. API risk score 520 may be determined by code segment monitor 120, for example, by API risk score component 302. API risk score 520 may be determined based on the number and type of API calls or actions coded into code segment 420, which may be relevant to the overall risk posed by the code segment 420.

FIG. 6B is an exemplary illustration depicting code blocks that may be analyzed for calculation of an API risk score in accordance with disclosed embodiments. Code blocks 611, 612, and 613 may be scanned for embedded credentials for determining embedded credentials risk score 510. Code blocks 611, 612, and 613 may represent an entire code segment 420, or may be a subset of code within code segment 420. Code block 611 may be scanned and one API call 621 may be identified. Code blocks 612 and 613 each have two API calls (622, 623; and 624, 625, respectively). The API calls may be detected through various text search methods or detection algorithms. In some embodiments, the API calls may be detected using AI or machine learning techniques, which may enable detection of API calls that are not included in a predefined search list. The total number of API calls within a code segment may be tallied for determining API risk score 520. A code segment with a greater number of API calls may be associated with a higher API risk score 520.

The type or function of the API call may also be relevant to the API risk score. Accordingly, each API call may be categorized based on the action type and associated risk. For example, AWS PowerShell™ may have APIs that provide read-only functionality (e.g., Read-, Get-, List-, Describe-, etc.) which may be categorized as "low" sensitivity. Other API calls (e.g., Add-, Enable-, Test-, Update-, etc.) may have more potentially harmful effects and may be classified as "medium" sensitivity. API calls that may pose greater or more permanent harm (e.g., Delete-, Remove-, Write-, etc.) may be classified as "high" sensitivity. The AWS PowerShell™ API calls are used by way of example only, and various other API calls and/or classifications may be used. As an illustrative example of the potential risks associated with varying API calls, a code section may be intended to delete logs that are older than 180 days, and thus may include a "Delete" API call. If misappropriated or misused, the same code segment could potentially be used to delete logs in a different range (e.g., to delete all recent logs, etc.).

Attackers (or employees by mistake), may only need to change the target range of the log files. Conversely, if the code contains functions only for reading logs, even if attackers successfully compromise the code and take control of the code's context (e.g., by exploiting a vulnerability of the software or system 100), the code segment could only be used to read other log files. The attackers could not delete the logs because the code originally didn't have the deletion API action. Therefore, the code with a deletion API action may pose a greater risk than the code with only reading API actions.

Accordingly, when scanning code block 612, for example, as shown in FIG. 6B, the detected API calls may be ranked or weighted differently. For example, API call 623 may be used to create a new AWS™ Identity and Access Management (IAM) group, and may be associated with a "medium" sensitivity, whereas API call 622 may be a read-only function and may be associated with a lower risk. Similarly, when scanning code block 613, API call 625 may be associated with a "high" sensitivity and thus may be weighted higher than API call 624.

API risk score 520 may then be calculated based on the total number of API calls and the type of each API call. Similar to the embedded credentials risk score, these values may be factored in various ways. For example, the total number of API calls may be weighted, such that higher-risk API calls have a greater impact on the API risk score. Additional factors may also be analyzed, such as the type or function of surrounding code within the code section, or various other factors. API risk score 520 may be represented in various forms or formats, for example, as a percentage, a numerical value, on a scale (e.g., ranging from 1-10 or 1-5), as a range of classifications (e.g. "moderate risk," "high risk," etc.), as text, as a graphic (e.g., a bar graph or other pictorial representation), a color, a combination of any of the above, or various other representations.

As shown in FIG. 5, process 500 may also include determining a resources risk score 530. Resources risk score 530 may be determined by code segment monitor 120, for example by resources risk score component 303. Resources risk score 530 may be determined based on the number of target resources identified in code segment 420 and/or the relative sensitivity of those target resources. For example, if a code segment contains a deletion API that targets only the logs of AWS™ cloud infrastructure, the code segment, if compromised or misused, could only delete AWS™ logs. In contrast, if a code segment that contains deletion API code targets AWS™, Azure™ cloud infrastructure, and Windows™ Event Log (e.g., for on-premises Windows™ machines), the code segment could potentially be used to delete the logs from all three of these targets. Therefore, the risk associated with the second example is higher.

Accordingly, code segment 420 may be scanned to identify target resources that may be accessed or subject to actions enabled by the code segment 420. In some embodiments, this may be done in conjunction with determining embedded credentials risk score 501 or API risk score 502. For example, when embedded credentials are identified in the code segment 420, code segment monitor 120 may analyze the resources that may be targeted through use of the credentials in that particular line of code or block of code. Code segment monitor 120 may also identify the target of various API calls identified in determining the API risk score, as described above. The code section 420 may also be scanned for a number of predefined target resources or predefined indicators of target resources in surrounding code. In some embodiments, AI or machine learning techniques may be implemented to identify target resources based on the text of the code 420. The total number of target resources may be tallied for purposes of determining resources risk score 330. For example, a higher number of target resources may correspond to a greater risk associated with the code segment 420.

The relative sensitivity of the target resources may also be relevant to determining resources risk score 530. For example, code segments targeting resources of greater sensitivity may be assigned a higher resource risk score. Accordingly, the relative sensitivity of each target resource may also be determined. The sensitivity may be based, for example, on the sensitivity of data or files that may be accessed through the resource. The sensitivity of the target resource may also be determined based on the level of privilege or credentials required to access the target resource. In some embodiments, other components of system 100, such as database 140 or server 150 may be accessed to determine the sensitivity of target resources identified in a code segment.

Resources risk score 530 may then be calculated based on the total number of resources and the corresponding sensitivity of each resource. These values may be factored in various ways, for example, by weighing each target resource based on the associated sensitivity. Additional factors may also be analyzed, such as the location of the target resource, the size of the target resource, the frequency of use of the target resource, etc. Similar to the other types risk scores described above, resource risk score 530 may be represented in various forms or formats, for example, as a percentage, a numerical value, on a scale (e.g., ranging from 1-10 or 1-5), as a range of classifications (e.g. "moderate risk," "high risk," etc.), as text, as a graphic (e.g., a bar graph or other pictorial representation), a color, a combination of any of the above, or various other representations.

Process 500 may further include determining a special risk factor 540. For example, special risk factor 540 may be determined by code segment monitor 120 by special risk factor component 304. There may be other factors or variables that are to be considered when determining combined risk factor 550. Special risk factor 540 may allow these factors to be accounted for and may be used to adjust the combined risk factor 550. In some embodiments, special risk factor 540 may be used to adjust or limit one or more of embedded credentials risk score 510, API risk score 520, or resources risk score 530 before they are used in determining combined risk score 550. Alternatively, or additionally, special risk factor 540 may be used to adjust combined risk score 550 as a final step or to define boundary conditions of the combined risk score. In some embodiments special risk factor 540 may comprise more than one special risk factor, each of which may be applied in different ways to determine the combined risk score 550.

In some illustrative embodiments, special risk factor 540 may be used to override combined risk score 550 based on the type of credentials detected in the code segment. For example, if one of the embedded credentials detected for calculating embedded credentials risk score 510 is an administrator credential, special risk factor 540 may automatically increase combined risk score 550 to a set value (e.g., 100% risk), regardless of risk scores 510, 520, and 530. In some embodiments, special risk factor 540 may depend on the target resources determined in calculating resources risk score 530. For example, if one of the target resources is designated as privileged or highly sensitive (e.g., a resource that is under General Data Protection Regulation rules of the European Union), special risk factor 540 may set a minimum combined risk score value (e.g., 80%). In other embodiments, special risk factor 540 may include further analysis of code segment 420 or data collected in generating risk factors 510, 520, and/or 530. For example, if all discovered target resources contain the text "demo" in their name, this may indicate that these resources are part of a test or demonstration environment. Accordingly, special risk factor 540 may automatically decrease combined risk score 550 (e.g., setting a maximum value of 10%). The various risk factors described above are provided by way of example only. Special risk factor 540 may be used to adjust combined risk factor 550 in a wide variety of other ways, which may be customized based on the particular environment and application.

Process 500 may include determining a combined risk score 550. In some embodiments, combined risk score 550 may be an aggregation of risk scores 510, 520, and 530, described in detail above. These risk scores may be inputs into a formula or algorithm used to determine combined risk score 550. Combined risk score may weigh each of risk scores 510, 520, and 530 differently, for example, based on a predefined formula, or based on attributes of code segment 420. As described above, special risk factor 540 may be used to adjust one or more of risk scores 510, 520, and 530, and/or combined risk score 550.

In some embodiments, combined risk score 550 may not be calculated based on distinct risk factors 510, 520, and 530 as separate values, but may be based on an aggregation of data associated with those risk factors. In other words, rather than inputting three separate risk factors into a formula, the embedded credentials, API calls, and target resources of the code segment may be analyzed in conjunction to determine combined risk score 550. For example, an API determined to have a "medium" sensitivity that targets a highly-sensitive restricted resource but that is not accompanied by the required credentials to access the resource, may be weighed differently than an API with "high" sensitivity targeting an unsensitive resource where credentials are embedded. Thus, risk factors 510, 520, and 530 may be assessed on an element-by-element basis in determining combined score 550. In some embodiments, process 500 may involve using machine learning to develop a model for determining combined risk score 550. For example, a number of code segments with designated risk scores may be fed into a machine learning algorithm as training data to develop a model for determining combined risk score 550.

Similar to each individual risk score 510, 520, and 530 described above, combined risk score 550 may be represented in a variety of forms or formats. For example, combined risk score 550 may be represented as a percentage, a numerical value, as a scale (e.g., ranging from 1-10 or 1-5), as a range of classifications (e.g. "moderate risk," "high risk," etc.), as text, as a graphic (e.g., a bar graph or other pictorial representation), a color, a combination of any of the above, or various other representations. In some embodiments, combined risk score 550 may be defined in terms of a privilege level associated with code segment 420. In other words, rather than describing the risk associated with the code segment, combined score 550 may define a privilege score and may be used to assign a privilege level to that particular code segment. For example, an application for reading and presenting weather to end users in a system will have a lower privilege level than an application meant for managing and controlling firewall rules in a network. This privilege level may be determined based on the combined risk score 550 calculated through process 500, or may be calculated as the risk score itself. Accordingly, while combined risk score 550 is referred to as a "risk score" throughout the present disclosure, it is understood that the calculated score may also be defined as a privilege score or privilege level associated with a corresponding code segment.

Process 500 may be implemented by various techniques within system 100 for monitoring and analyzing code. In some embodiments, process 500 may be implemented as an external scan. In such embodiments, code segment monitor 120 may scan one or more code repositories of system 100 through network 110. The code repositories may be located, for example, in database 140, computing device 130, and/or server 150. Code segment monitor 120 may be configured to scan all code within the system or a subset of code, for example, in designated locations. Code segment monitor 120 may be configured to scan the code repositories or other locations on system 100 at predetermined times (e.g., every few minutes, few hours, few days, etc.). Alternatively, or additionally, code segment monitor 120 may be set to scan and analyze code based on a trigger event, such as an indication of a security breach within system 100. Code segment monitor 120 may also be run manually, for example, by an administrator of system 100.

In some embodiments, process 500 may be implemented as an "in-line" scan of system 100, assessing code dynamically and in real time. In such embodiments, code segment monitor 120 may access code repositories within system 100 (e.g., in database 140) and may scan and analyze code segments as they are developed and/or modified. Accordingly, code segment monitor 120 may access software used by developers to analyze code segments in real time as they are developed. For example, code segment monitor 120 may access Integrated Development Environment (IDE) 132, as shown in FIG. 1. Thus, as a developer (e.g., user 131) creates one or more lines of code, code segment monitor 120 may analyze the code segments and determine a risk score. In some embodiments, the risk score may be displayed to the developer, for example, within IDE 132 or through a user interface of computing device 130. This may allow a developer to better understand the security implications or risks associated with the code as it is being developed. In some instances, code segment monitor 120 may also suggest or require the developer to modify or improve the security of the code as it is being developed. Alternatively, or additionally, the code segment monitor 120 may flag or classify code based on the real-time risk score as it is developed.

Process 500 may also be implemented as part of a development and operations ("DevOps") pipeline. Risk assessment of the code may be implemented as an integrated step in the software development cycle. For example, the risk assessment may occur after the code finishes the testing phase and before it continues to production phases. In such embodiments, the risk score calculated in process 500 may determine later steps of the DevOps pipeline process. For example, if the risk score exceeds a threshold set by an organization, the code or code segment may be flagged or classified based on the risk associated with the code. The development of the code may be stopped altogether, designated as requiring additional review and/or modifications, released for production in a limited capacity, require authentication (e.g., two-factor or single-factor), or be subject to various other actions.

In some embodiments, code segment monitor 120 and/or process 500 may further be used to detect anomalies in code and/or the DevOps process. Such anomalies may indicate malicious activity (e.g., by an attacker), or an error (e.g., by a developer, an employee, a computing process, etc.). Using the anomaly detection functionality, code segment monitor 120 may track one or more developers, software code, code segments, computing devices, or the like over time and observe deviations or trends associated with the risk scores or privilege levels.

Figure 7:
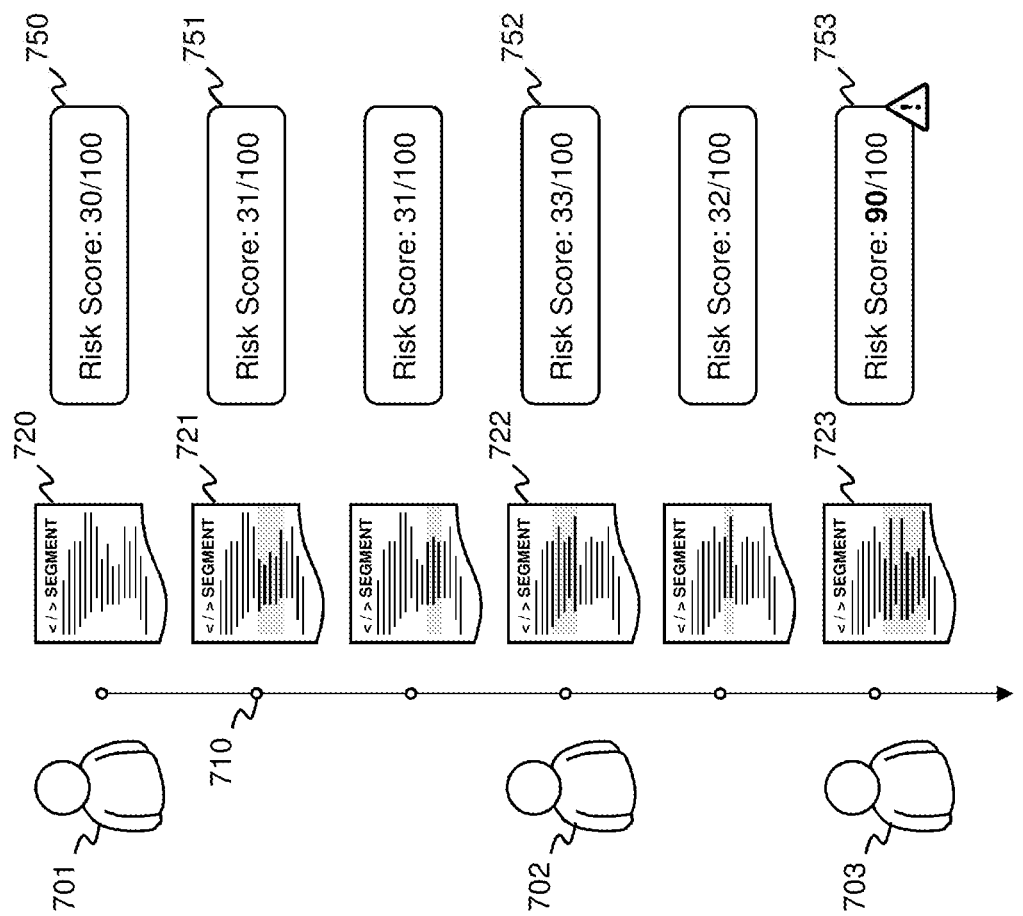
FIG. 7 is an illustration depicting an exemplary anomaly detection operation mode in accordance with disclosed embodiments.

FIG. 7 is an illustration depicting an exemplary anomaly detection operation mode in accordance with disclosed embodiments. Code segment monitor 120 may track one or more users 701, code segments 720, and/or risk scores 750. In the example of FIG. 7, changes to a code segment are tracked at various points in time, indicated by points 710. The various points may represent a profile that is generated for a given code segment. In this example, users 701, 702, and 703 may be one or more developers modifying the code segment.

Code segment 720, developed by user 701, may have an initial associated risk score 750 of 30/100. Risk score 750, for example, may have been determined through process 500 using the various methods described above. Code segment 720 may be updated by user 701 at a later time, resulting in code section 721, which may be assigned an updated risk score 751 of 31/100. As other users, such as user 702, modify the code the resulting in code segment 722, the updated code segment 722 may be analyzed to determine the resulting risk score 752, which is 33/100. Any subsequent changes may be tracked in the profile.

Code segment monitor 120 may further be configured to detect anomalies in the tracked code segments. For example, user 703 may modify a code segment, resulting in code segment 723. Code segment monitor 120 may determine a risk score 753 of 90/100 for the modified code segment 723, which may represent a sudden increase from previous risk scores, all of which have been between 30 and 35 out of 100. This sudden change may represent malicious or insecure activity within system 100. For example, this heightened risk score 753 may indicate that user 703 is an attacker and code segment 723 has been compromised. This may also indicate that an error or other insecure attribute has been introduced in developing code segment 723, for example user 703 may be a developer who has inadvertently altered code section 723. This may also represent that user 703 has modified the code in violation of one or more rules or policies of the organization. Accordingly, code segment monitor 120 may take a control action, which may include flagging or reporting the anomaly, quarantining or disabling code segment 723, mitigating or addressing harm that may be caused by code segment 723, reporting or restricting further actions by user 703, or various other control actions. As anomalies may be detected on a code segment level, code segment monitor 120 or an organization associated with system 110 may more efficiently pinpoint the anomaly. Further, the exact lines of code that have been modified may also be determined, by comparing the code segment to previous iterations within the code segment profile.

Similar to the code segment profile shown in FIG. 7, the anomaly detection mode may also build profiles for individual users. For example, a developer may frequently write or modify code segments with risk scores and/or privilege levels within a given range. Similar to the example above, if the developer commonly accesses or develops code segments with risk scores between 30 and 35 out of 100, and then suddenly accesses or writes a code segment with a risk score of 90, an anomaly may be detected. For example, this may indicate that a user may be an attacker, or that a developer has made an error, and a control action may be taken by code segment monitor 120 and/or other components associated with system 100. While a relatively large spike from 32/100 to 90/100 is used in the examples above, this is intended to be illustrative only, and much more discrete anomalies may be detected, for example, by detecting trends over long time intervals. The anomaly may be detected based on the risk score or the rate of change of the risk score exceeding a threshold. The anomaly may further be detected using a more complex formula, for example, comparing the trend of one or more users or code segments to the trends of other users or code segments in system 100.

In various disclosed embodiments, the anomaly detection mode may use AI or machine learning for building the user or code segment profiles, and/or detecting anomalies. For example, a model may be developed to detect abnormal behavior by one or more users or code segments. A set of training data may be developed containing one or more of user profile data, code segments, code segment data, and/or risk scores or factors. Various features may be extracted from the data and fed to a training algorithm to learn which features correspond to an anomaly in the system. For example, known security breaches or employee errors may be provided to the training algorithm. A model may then be developed using a suitable machine learning algorithm (e.g., a logistic regression, a linear regression model, a lasso regression analysis, a random forest model, a K-Nearest Neighbor (KNN) model, a K-Means model, a decision tree, a cox proportional hazards regression model, a Naïve Bayes model, a Support Vector Machines (SVM) model, gradient boosting algorithms, etc.). The model may also be developed using an unsupervised or reinforcement machine learning process, where manual training is not required.

In some embodiments, the disclosed systems and methods may be integrated with other existing security solutions. The calculated risk score may be used to facilitate or enhance other security measures within system 100, which may include secret vaults, security event information management (SEIM) systems, firewalls, intrusion prevention systems, or other solutions that may receive and process a calculated risk score for a code segment. For example, a firewall may be configured to periodically or continuously receive a calculated risk score for an application or other software. Upon detection of an anomaly or irregularity in the calculated risk score, the firewall may block one or more features associated with the application, such as the application's ports or other means of communication through the network. Other existing solutions may similarly perform security actions based on the calculated risk score.

Figure 8:
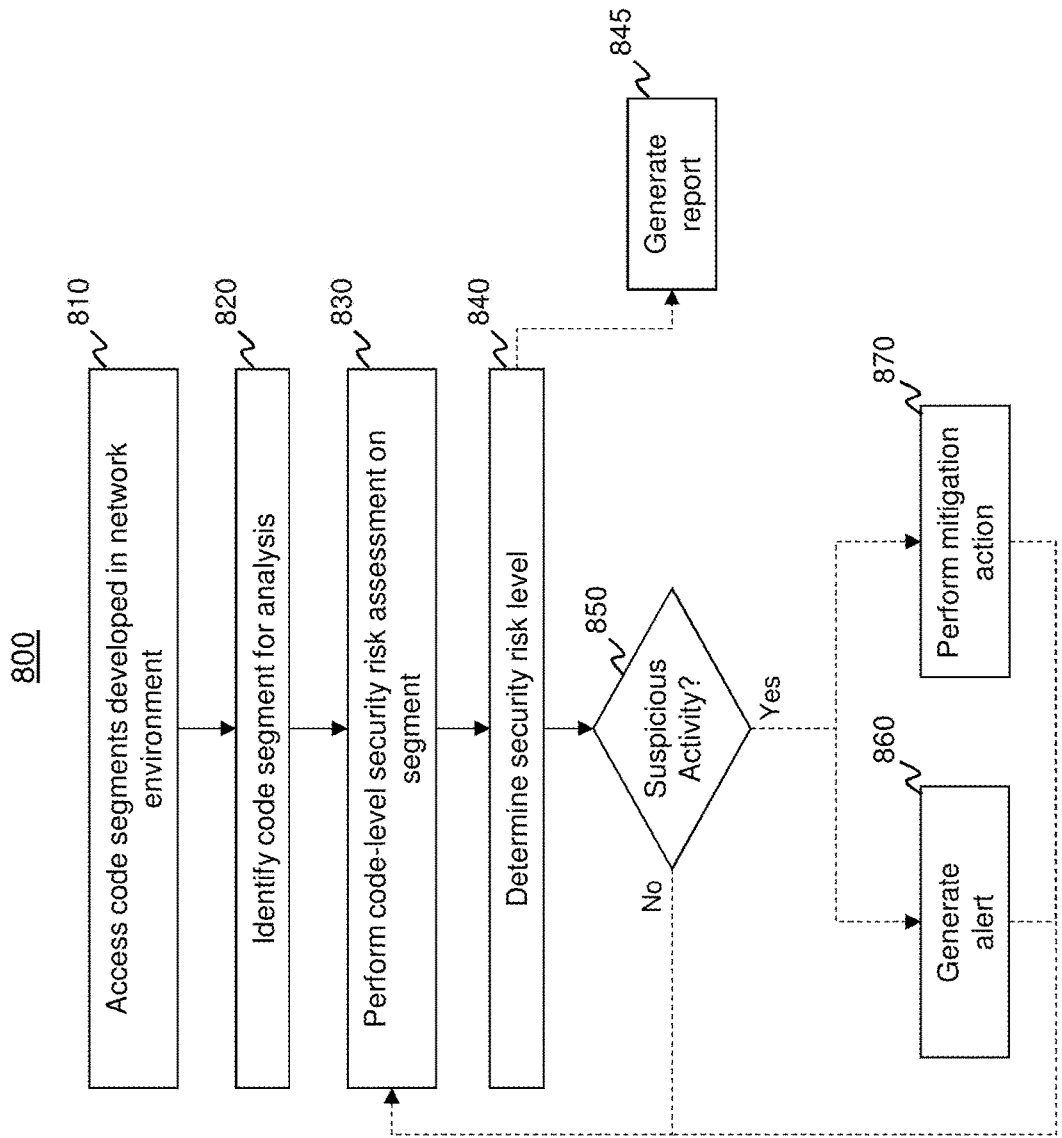
FIG. 8 is a flowchart depicting an exemplary process for automatically detecting and addressing security risks in code segments in accordance with disclosed embodiments.

FIG. 8 is a flowchart depicting an exemplary process 800 for automatically detecting and addressing security risks in code segments in accordance with disclosed embodiments. Process 800 may be performed, for example, by one or more processors 210 associated with code segment monitor 120. Accordingly, descriptions of the various components or procedures described above with respect to process 500 may equally apply to process 800.

At step 810, process 800 may include accessing a plurality of code segments developed for execution in a network environment. The plurality of code segments may correspond to code segments 420, as described above with respect to FIG. 4. For example, the code segments may be extracted from a software code, which may include various formats and/or programming languages, as described above. The code segments may be developed by a developer for execution within a network environment, such as system 100. In some embodiments, the code segments may be implemented within the system such that they may be executed by one or more computing devices. In other embodiments, the code segments may still be in development and/or production, for example, as part of a DevOps process.

The code segments may be accessed in step 810 through various methods as described above. For example, accessing the plurality of code segments may include scanning one or more code repositories in the network environment, such as periodically, or based on one or more triggers. In some embodiments, accessing the plurality of code segments may include dynamically scanning the network environment in real time. In such embodiments, step 810 may include scanning one or more repositories within the network environment and analyzing code segments as they are developed and/or modified. Accordingly, process 810 may further include accessing code development software, in an Integrated Development Environment to monitor and assess code segments as they are developed. Alternatively, or additionally, accessing the plurality of code segments includes analyzing a DevOps pipeline comprising the plurality of code segments, wherein the plurality of code segments have not yet been deployed into production. For example, process 800 may be performed as an integrated step within a software development cycle. Whether the code segment is deployed into production may depend, at least partially, on a risk level determined through process 800.

At step 820, process 800 may include automatically identifying a first code segment from the plurality of code segments for analysis. The first code segment may be identified through various methods or procedures. For example, the first code segment may be identified as part of a scan performed on the network environment, where each code segment is analyzed in turn. Where process 800 is implemented as an "inline" scan, dynamically accessing the code in real time, the first code segment may be identified based on a status of the code segment. For example, the code segment may be identified after it has been developed or after modifications have been made to the code segment. Where process 800 is implemented as an integrated step in a DevOps pipeline, the code segment may be identified based on reaching a certain phase of development. In some embodiments, the first code segment may be alterable, in real time, to produce a modified version of the first code segment. For example, the code segment may still be in a development phase, and may be alterable by a developer or component in the network environment.

At step 830, process 800 may include automatically performing a first code-level security risk assessment for the first code segment. The first code-level security risk assessment may be performed according to various steps of process 500, described in detail above. In embodiments where process 800 is implemented dynamically in real time, the assessment in step 830 may be performed automatically based on a status of the code segment. For example, the first code-level security risk assessment may be performed automatically upon creation of the first code segment or in response to a change in the first code segment. In some embodiments, the assessment may be performed automatically based on one or more specific changes to the code, such as in response to a change in the one or more application programming interface action calls or a change in the one or more credentials. For example, insertion of an additional API call or embedded credential may trigger step 830.

Performing the first code-level security risk assessment may be based on one or more risk levels, such as Embedded Credentials Risk Score 510, API Risk Score 520, and Resources Risk Score 530 described above with respect to FIG. 5. For example, in some embodiments, the first code-level security risk assessment may be based on an application programming interface risk level, based on at least a number or a type of one or more application programming interface action calls associated with the first code segment. As described above, step 830 may include scanning the code segment to identify API calls embedded in the code segment. The application programming interface risk level may further be based on a determination of whether the one or more application programming interface action calls have security risks. For example, the API calls identified in the code segment may be assessed based on the type and function of the API call.

Alternatively, or additionally, the assessment may be based on an embedded credentials risk level, based on at least a number or a type of one or more credentials associated with the first code segment. This may correspond to embedded credentials risk score 510, and thus may include identifying embedded credentials within the code segment. The embedded credentials risk level may be further based on a degree of privileged access associated with the one or more credentials. For example, as described above, the privilege level for each embedded credential may be determined for calculating the embedded credentials risk level.

The assessment may also be based on a target resource risk level, based on at least a number or a type of one or more references to target resources associated with the first code segment. The target resource risk level may correspond to resources risk score 530, as described above. Accordingly, step 830 may include identifying target resources within the code segment determining a sensitivity level of the target resources. Accordingly, the target resource risk level may also be based on a determination of whether the target resources are sensitive network resources.

In some embodiments, automatically performing the first code-level security risk assessment may include determining a customizable risk factor that is configured to be unique to the network environment. The customizable risk factor, for example, may correspond to special risk factor 540, as shown in FIG. 5. Accordingly, the customizable risk factor may be configured to adjust or modify the various risk levels determined in step 830, or a first security risk level determined in step 840, as described below. The customizable risk factor may be determined based on one or more properties or variables associated with the code segment and/or the network environment. Based on these properties or variables, the customizable risk factor may be configured to set the first security risk level to a specific value, or set a maximum and/or minimum boundary for the first security risk level. Process 800, therefore, may include accessing and/or generating one or more of the risk levels and/or customizable risk factors described above.

At step 840, process 800 may include determining a first security risk level for the first code segment based on the application programming interface risk level, the embedded credentials risk level, and/or the target resource risk level. The first security risk level may correspond to combined risk score 550 determined in process 500. Accordingly, the first security risk level may be determined based on analyzing and aggregating the application programming interface risk level, the embedded credentials risk level, the target resource risk level, and/or the customizable risk factor, for example, based on a predefined formula or algorithm.

As shown in FIG. 8, process 800 may also be an iterative process. Upon determining the security risk level in step 840, process 800 may repeat one or more previous steps in process 800. The iterations may correspond to multiple scans being performed on a system, or may be based on detected modifications to the code segment. For example, if process 800 is implemented as an inline process or part of a DevOps pipeline, process 800 may include reanalyzing the code segment during development. Accordingly, process 800 may return to step 830 and may include automatically performing a second code-level security risk assessment for a modified version of the first code segment. The second code-level security risk assessment may be performed similar to the first code-level security risk assessment, for example, according to various steps of process 500. The modified version of the first code segment may be based on one or more changes to the first code segment subsequent to the first code-level security risk assessment, for example, through a code development process. The modified version of the first code segment may include a change to at least one of the application programming interface risk level, the embedded credentials risk level, or the target resource risk level. Accordingly, process 800 may include accessing or determining one or more of these risk levels for the modified code segment. Process 800 may therefore include determining a second security risk level for the modified version of the first code segment using the methods described above with respect to step 840.

Process 800 may also include step 845 of automatically generating a report based on the security risk level associated with the first code segment, as described in detail above. The report may be configured to provide security risk information associated with the first code segment to identify security risks in the network environment. The report may identify the first security risk level determined in step 840 and/or the application programming interface risk level, embedded credentials risk level, target resource risk level, and/customizable risk factor determined in step 830. The report may include various other data, such as data associated with any of these risk scores or risk factors, information about the corresponding code segment, information about the scan that was performed, or other various information. In some embodiments, the report may flag or highlight code segments associated with one or more risk scores that exceed a threshold. The report may also group the scanned code segments and associated data, for example by the corresponding code or software the code segment was extracted from or based on the associated risk level. One or more summaries, graphs, charts, tables, recommendations, or other means of interpreting the data may also be generated and included in the report.

Where multiple iterations of process 800 are used, the report may also highlight changes or variations between previous risk levels or factors determined through process 800 for a particular code segment. For example, process 800 may include automatically generating a report based on a change in security risk associated with the first code segment. The report may further identify the change to at least one of the application programming interface risk level, the embedded credentials risk level, the target resource risk level and the customizable risk factor used to determine the risk level in step 840. In some embodiments, the report may identify a privilege threat alert associated with the code segment. For example, the alert may be based on the embedded credentials, API calls, and/or target resources identified within the code segment.

In some embodiments, multiple iterations of process 800 may be used to monitor and identify security risks within the network environment. For example, process 800 may enable a comparison between the first security risk level and the second security risk level to identify a change in security risk associated with the first code segment. A change in security risk may indicate that a particular code segment has been modified either maliciously (e.g., by an attacker) or inadvertently by an employee or other entity. In some embodiments, a user may be enabled to view the first security risk level and the second security risk level to facilitate the comparison, for example, on a display within the network environment. In some embodiments, the comparison may be enabled through the report generated in step 840.

Process 800 may further include a step 850 of detecting suspicious activity within the network environment. For example, suspicious activity may be determined based on the security risk level determined in step 840. In some embodiments, the suspicious activity may be determined based on a change or trend in security risk levels when multiple iterations are performed. For example, as described above, process 800 may be implemented as an anomaly detection process and may maintain profiles for one or more users, code segments, or software. Accordingly process 800 may further include updating a profile associated with a creator of the first code segment based on the change in security risk associated with the first code segment. The change in security risk may indicate that the creator has modified the code segment in a way that poses potential harm on the network environment.

In the event that suspicious activity is detected in step 850, one or more control actions may be implemented. For example, as shown by step 870, a privilege mitigation action may be performed for preventing the first code segment from being deployed for execution in the network environment. This may include, for example, preventing further steps in a DevOps pipeline when process 800 is implemented as an integrated step in the process. The privilege mitigation action may include one or more actions directed to credentials or authentication requirements associated with the code segment or elements in the code, such as disabling or rotating one or more credentials. For example, if an API call is added that increases the risk level associated with the code segment, the embedded credentials associated with the API call may be disabled and/or rotated. Alternatively, or additionally, the privilege mitigation action may change an authentication requirement associated with one or more target resources associated with the code segment, for example, by changing a privilege level or other security requirements associated with the resource. The privilege mitigation action may also include adding an authentication requirement for the first code segment, for example, requiring a user to be authenticated before the code can be executed. Step 870 may also include blocking and/or isolating a specific user or user machine (e.g., if the suspicious activity indicates the machine has been compromised by an attacker). In some embodiments, the control action may include actions directed towards the code itself, such as reverting the software or code segment to a previous state. Step 870 may also include deleting specific portions of the code to reduce the risk score, for example, by automatically deleting credentials that were embedded into the code. Various other mitigation actions may also be performed, which may include actions by separate security solutions, as described above. Upon completion of the mitigation action, process 800 may continue to monitor the code segment and may repeat one or more previous steps of process 800.

Figure 9:
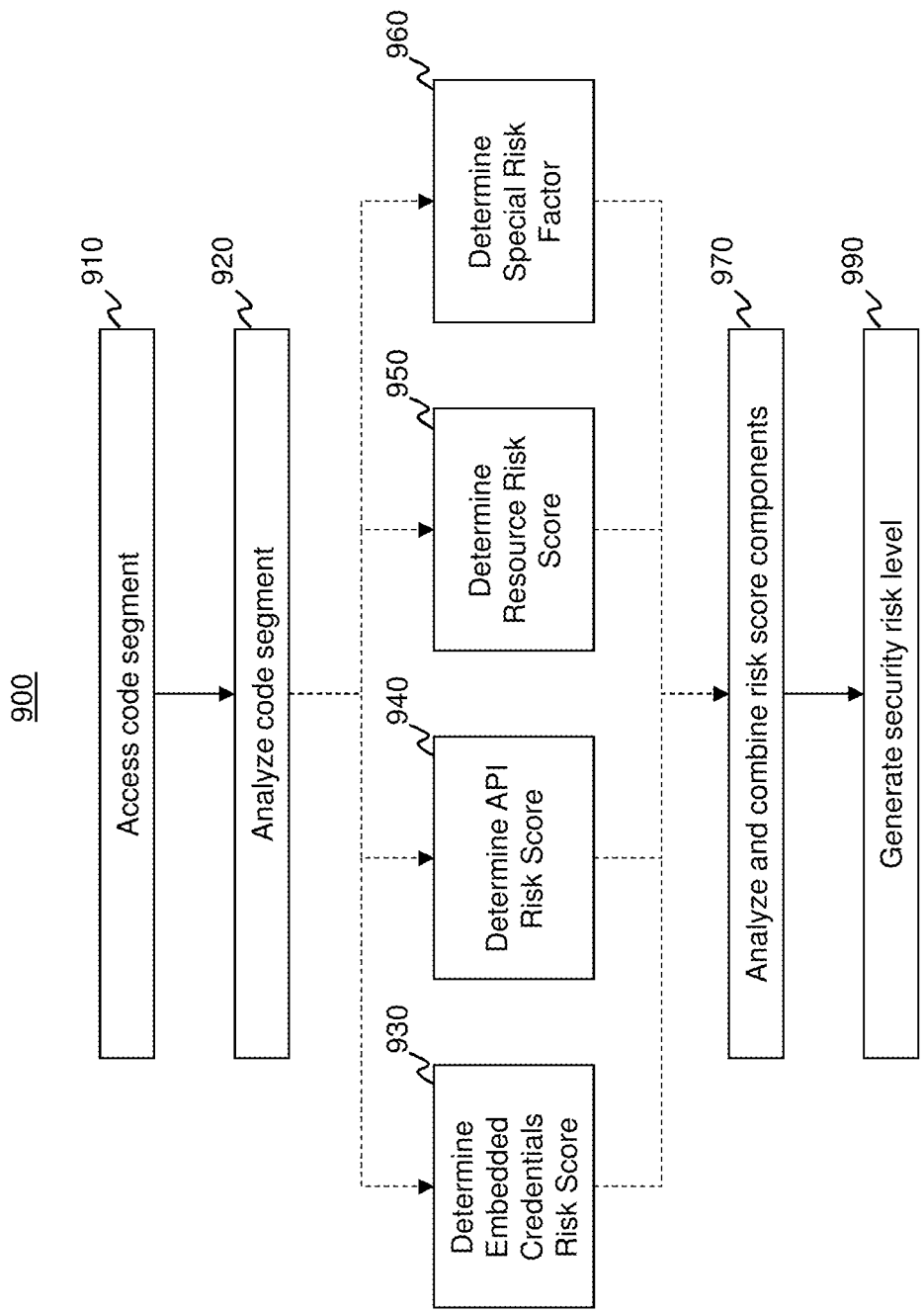
FIG. 9 is a flowchart depicting an exemplary process for determining a security risk level for a code segment in accordance with disclosed embodiments.

FIG. 9 is a flowchart depicting an exemplary process 900 for determining a security risk level for a code segment in accordance with disclosed embodiments. Process 900 may correspond to process 500 depicted as a block diagram in FIG. 5. Accordingly, the descriptions and methods described above with respect to process 500 may equally apply to process 900. Process 900 may also correspond to steps 830 and 840 of process 800 for analyzing a code segment and determining a security risk level.

At step 910, process 900 may include accessing one or more code segments to be analyzed. The code segments may be identified through process 800 as part of step 820. Accordingly, the code segments may be accessed based on a scan of system 100 or based on creation or modification of the code segment. At step 920, process 900 may include analyzing the code segment. This may include determining one or more risk scores and/or risk factors. In step 930, process 900 may include determining an embedded credentials risk score, which may correspond to embedded credentials risk score 510. The embedded credentials risk score may be based on the number and type of credentials hard-coded into the code segment. In step 930, process 900 may include determining an API risk score, which may correspond to API risk score 520. The determined API risk score may represent the number and type of API calls included in the code segment. In step 950, process 900 may include determining a resource risk score, which may correspond to resource risk score 530. The resource risk score may indicate the number of resources targeted in the code segment and the sensitivity of the target resources. In step 960, process 900 may further include determining a special risk factor, which may correspond to special risk factor 540. The special risk factor may be customizable based on the particular network environment.

At step 970, process 900 may include analyzing and combining risk score components. As described in detail above, the risk scores determined in steps 930, 940, and 950 may be combined according to one or more algorithms and/or formulas. The special risk factor determined in step 960 may be used to adjust the individual risk scores or combined risk score based variables or factors associated with the network environment. At step 980, a risk score may be determined for the code segment. This combined risk score may correspond to combined risk score 550 and/or the security risk level determined in step 840 of process 800. The risk score determined in step 980 may indicate an overall security risk presented by the code segment based on the various risk scores determined in steps 930, 940, and 950.

Various potential use cases of the disclosed embodiments are described below. It is understood that these cases are provided by way of example only and are not limiting of the present disclosure. One potential use case may be for cloud-oriented scripts and code functions. Organizations frequently rely on cloud-based services and platforms (e.g. AWS™, Azure™, Google Cloud™) for storage and management of data. These platforms commonly offer official APIs and software development kits (SKDs) for developing code to use these services effectively. Apps developed using these SDKs an APIs can run both as regular code, or as a serverless function.

The disclosed methods and systems may be used to automatically detect and address security risks for code in the cloud environment. For example, the system may periodically scan the cloud environment for code and scripts to identify code segments to be assessed. Alternatively, or additionally, the system may monitor code as it is developed, for example by monitoring an IDE associated with the cloud platform's SDK. Using the methods described above, a risk level for each code segment can be determined and tracked over time. The system may also detect anomalies in the code segment, for example, if the code segment suddenly has an increased security risk. This may allow the organization to identify the potential security risk and/or an individual developer associated with the increased risk.

Another potential use case may be for software associated with a financial services provider. Similar to the previous example, a large amount of software may be developed and/or stored in a code repository. The code may be divided into segments and assessed either periodically, or as the code is being developed or modified. A risk level may be assessed based on a number of risk score components, including an embedded credentials risk score, an API risk score, and a target resources risk score.

In this example, the embedded credentials may correspond to embedded authentication data, such as usernames and passwords of an account holder or biometric data, such as fingerprint data, etc. The API risk score, or the equivalent in this case, may examine functions and actions used in the code and categorize them, similar to the API functions described above. In this example, however, the functions may be associated with financial services actions. Functions such as getting an account balance may be classified with a lower sensitivity, whereas actions such as making a money transfer or changing an account password may have a high sensitivity ranking. Based on the number and type of functions, the "API risk score" can be determined. The target resources risk score may be assessed based on the number and types of accounts targeted by the code. For example, a regular user's bank account may be treated as lower sensitivity than a government or organization's account. The accounts may also be ranked based on the current available balance, the account type, or other factors. A customizable risk score factor may also be included, which may be tailored to the financial services environment. For example, credentials for certain account holders may automatically trigger a minimum risk score. Consistent with the embodiments above, a risk score may be determined and a risk level for each code segment may be tracked to detect potential issues.

Another potential use case may be for autonomous vehicles. As vehicles become increasingly capable of navigating independent of user input, vehicles also become increasingly dependent on software. Due to the connectivity of modern vehicles, code may be updated and/or modified continuously. The disclosed methods and systems may be used to monitor code by vehicle manufacturers as it is developed, or even within a vehicle itself, to monitor code as it is added to the vehicle's control system.

In this case the embedded credentials risk score, the API risk score and the target resource risk score may be tailored to autonomous vehicle technologies. For example, the embedded credentials risk score may be determined based on embedded authentication data that may be used for navigation commands, such as biometric data of the driver, etc. The API risk score may assess functions of the code segments, and classify them, similar to the previous use case. In this example, however, functions such as reading the speed, detecting whether a passenger is in the seat, or reading the air tire pressure may be classified as low sensitivity. Other functions, such as steering commands, engaging the breaks, or various other navigational commands may be treated with high sensitivity based on their potential for harming the vehicle or passengers. The target resources risk score may analyze the number and type of components targeted by the code. For example, adjustments to the passenger's seat may be treated with a lower sensitivity than actions targeting the steering or braking system.

The system may be implemented by an organization during development to detect potential security issues as the code is being developed for production. Alternatively, if implemented within a vehicle, the vehicle may detect potential security or safety issues as the software is updated. For example, a sudden increase in risk associated with a code segment may indicate the vehicle's code has been compromised by an attacker. The vehicle may then take a control action, such as alerting the driver, disabling the portion of code, reducing the speed of the vehicle or any other appropriate response actions. Thus, using the disclosed methods, security and safety of an autonomous vehicle may be improved.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials, and code types will be developed, and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A non-transitory computer readable medium including instructions that, when executed by at least one processor, cause the at least one processor to perform operations for automatically detecting and addressing security risks in code segments, the operations comprising:
    automatically identifying a code segment included in or developed for inclusion in a body of code for execution in a network environment;
    scanning the code segment to identify one or more credentials coded into the code segment and one or more application programming interface action calls included in the code segment, wherein the one or more credentials are required for accessing at least one target resource;
    determining an embedded credentials risk level based on a quantity of the identified one or more credentials;
    determining an application programming interface risk level based on a type of at least one of the identified one or more application programming interface action calls, the at least one application programming interface call being directed to the at least one target resource;
    determining a security risk level for the code segment based on the embedded credentials risk level and the application programming interface risk level, wherein determining the security risk level includes determining whether at least one of the identified one or more credentials enables access to the at least one target resource via the at least one application programming interface action call without requiring supplemental credentials to be provided by a user;
    identifying an anomaly in the code segment indicating a security risk associated with the code segment; and
    applying, based on the identification, a control action associated with at least one of the code segment, the network environment, or an identity associated with the code segment.

2. The non-transitory computer readable medium of claim 1, wherein identifying the anomaly comprises:
    identifying at least one additional code segment developed for execution in the network environment;
    determining a security risk level for the additional code segment; and
    comparing the security risk levels for the code segment and the additional code segment.

3. The non-transitory computer readable medium of claim 2, wherein the additional code segment is included in the body of code.

4. The non-transitory computer readable medium of claim 2, wherein the additional code segment comprises a modification of the code segment.

5. The non-transitory computer readable medium of claim 1, wherein identifying the anomaly comprises identifying suspicious code injected into the code segment.

6. The non-transitory computer readable medium of claim 1, wherein automatically identifying the code segment comprises dynamically scanning the network environment in real time.

7. The non-transitory computer readable medium of claim 1, wherein the identity comprises a creator of the code segment.

8. The non-transitory computer readable medium of claim 1, wherein the control action comprises modifying at least one authentication requirement associated with the identity.

9. The non-transitory computer readable medium of claim 1, wherein the control action comprises modifying at least one authentication requirement associated with the code segment.

10. The non-transitory computer readable medium of claim 1, wherein the control action comprises flagging the one or more credentials.

11. The non-transitory computer readable medium of claim 1, wherein the control action comprises disabling the one or more credentials.

12. The non-transitory computer readable medium of claim 1, wherein the control action comprises removing the one or more credentials from the code segment.

13. The non-transitory computer readable medium of claim 1, wherein the control action comprises reporting the anomaly.

14. A computer-implemented method for automatically detecting and addressing security risks in code segments, the method comprising:

automatically identifying a code segment included in or developed for inclusion in a body of code for execution in a network environment;

scanning the code segment to identify one or more credentials coded into the code segment and one or more application programming interface action calls included in the code segment, wherein the one or more credentials are required for accessing at least one target resource;

determining an embedded credentials risk level based on a quantity of the identified one or more credentials;

determining an application programming interface risk level based on a type of at least one of the identified one or more application programming interface action calls, the at least one application programming interface call being directed to the at least one target resource;

determining a security risk level for the code segment based on the embedded credentials risk level and the application programming interface risk level, wherein determining the security risk level includes determining whether at least one of the identified one or more credentials enables access to the at least one target resource via the at least one application programming interface action call without requiring supplemental credentials to be provided by a user;

identifying an anomaly in the code segment indicating a security risk associated with the code segment; and applying, based on the identification, a control action associated with at least one of the code segment, the network environment, or an identity associated with the code segment.

15. The computer-implemented method of claim 14, wherein identifying the anomaly comprises:

identifying at least one additional code segment developed for execution in the network environment;

determining a security risk level for the additional code segment; and comparing the security risk levels for the code segment and the additional code segment.

16. The computer-implemented method of claim 14, wherein the operations further comprise updating a profile associated with a creator of the first code segment based on the security risk.

17. The computer-implemented method of claim 14, wherein the application programming interface risk level is based on a determination of whether the one or more application programming interface action calls have security risks.

18. The computer-implemented method of claim 14, wherein the embedded credentials risk level is determined based on a degree of privileged access associated with the one or more credentials.

19. The computer-implemented method of claim 14, wherein the target resource risk level is determined based on a determination of whether the target resources are sensitive network resources.

20. The computer-implemented method of claim 14, wherein applying the control action comprises reporting the anomaly.

* * * * *